United States Patent [19]
Muskulus

[11] 3,874,424
[45] Apr. 1, 1975

[54] ARRANGEMENT FOR WINDING OF COILS INSERTABLE INTO STATORS OF ELECTRIC MACHINES

[75] Inventor: Willi Muskulus, Bergen-Enkheim, Germany

[73] Assignee: Balzer & Droll KG, Niederdorfelden, Germany

[22] Filed: July 30, 1973

[21] Appl. No.: 383,469

[30] Foreign Application Priority Data
July 29, 1972 Germany............................ 2237384

[52] U.S. Cl. .............................................. 140/92.1
[51] Int. Cl................................................. B21f 3/04
[58] Field of Search .................................. 140/92.1

[56] References Cited
UNITED STATES PATENTS

| | | | |
|---|---|---|---|
| 3,672,040 | 6/1972 | Arnold................................ | 140/92.1 |
| 3,732,897 | 5/1973 | Arnold et al....................... | 140/92.1 |
| 3,765,080 | 10/1973 | Lauer................................. | 140/92.1 |

*Primary Examiner*—Lowell A. Larson
*Attorney, Agent, or Firm*—Larson, Taylor & Hinds

[57] ABSTRACT

Apparatus for winding electric stator coils comprises a templet onto which the coil wire is wound and from which the wound coil is stripped, a rotatable wire-guiding device for winding wire in coil form onto the templet, and a transfer tool relatively movable axially in the templet and onto which the wound coils can be stripped from the templet. During the winding process, the rotating wire guide is relatively moved axially in a direction away from the transfer tool relative to the templet, and the transfer tool is relatively moved axially toward and into the templet, whereby the templet is essentially in coil transfer position on the transfer tool at the end of the winding process. Preferably the wire guide and the transfer tool are axially stationary, and the templet is moved axially during the winding process. The transfer tool preferably is a drawing-in tool, and several winding and drawing-in stations are provided through a rotary table arrangement.

13 Claims, 2 Drawing Figures

3,874,424

ARRANGEMENT FOR WINDING OF COILS INSERTABLE INTO STATORS OF ELECTRIC MACHINES

FIELD OF THE INVENTION

The invention relates to apparatus for winding of coils which can be drawn into a stator of electric machines, consisting of a rotating wire-guiding device, a one or multi step pattern or templet on which the coil wire can be wound, and a transfer tool which can be moved axially into the templet and onto which the coils can be stripped from the pattern.

BACKGROUND AND SUMMARY

Such an arrangement is described for example in the German Application No. 2,019,925, laid open to public inspection. In that case the winding of the templet and the dovetailing of the templet and the transfer tool, for the purpose of transferring the wound coil to the latter, are two completely separate operating processes, taking place successively in time, the operating times of which are thus additive.

The invention is based on the objective, of creating an apparatus of the initially stated type, in which the time period for the two above mentioned work processes is altogether considerably shortened.

According to the invention this objective is achieved by the fact that the wire guiding device can be relatively moved in a direction axially away from the transfer tool in relation to the templet during the winding process.

In case of the newly proposed apparatus, the templet, at the end of the winding process, is already essentially in that position, in relation to the transfer tool, which must be assumed by both parts for the transfer process of the coils from the templet to the transfer tool. During the axial relative movements of the three machine parts: wire guiding device, templet or pattern, and transfer tool, the latter can relatively follow very closely upon the wire guiding device, so that upon conclusion of the winding process, only a relatively short axial movement of the templet relative to the transfer tool is required in order to bring the last wound windings within the range of the transfer tool. This axial movement can be, for example, in the order of magnitude of only 10 to 20 mm. The transfer tool follows the wire guiding device at a generally correspondingly short interval during the winding process, if one considers the relative movement of both in relation to the templet.

In a preferred embodiment of the invention, the transfer tool is axially fixed during the winding process. In case of such an embodiment it is only necessary to move the templet axially during winding. Since the templet thereby also moves in relation to the wire guiding device, the latter too can be held axially fixed during the winding. Although functionally, two relative movements are needed for the two above mentioned operating processes, namely, for winding, the axial relative movement between templet and wire guiding device, and for the delivery of the wound coils, the axial dovetailing of templet and transfer tool, a single axially moved part will therefore suffice.

The preferred embodiment has, in addition, the advantage that the mounting of the transfer tools can be very simple and space saving, so that several of these tools can be disposed, for example, on a rotary table, and can be moved in succession underneath the same templet.

The transfer tools are preferably drawing-in tools from which the coils can be drawn-in directly into the stators, preferably in a special switching station of the rotary table.

Whenever the templet, that must be anchored firmly against rotation, and the rotating wire-guiding device are mounted coaxially one in the other, it is difficult to hold this axis firmly against rotation despite the winding wire, which is being supplied coaxially, circling the templet axle over its entire length. In a preferred embodiment of the invention it is proposed in this respect, to connect the templet, or the axle carrying it, firmly together rotatably with a gear with interior teeth, which mates with a gear with exterior teeth which is mounted rotatably and eccentrically on a hollow shaft, disposed coaxially in relation to the axis of the templet and constituting the driving shaft of the wire guiding device, and which engages with a non-rotatable toothed ring with interior teeth whereby the hollow shaft and the wire guiding device are mechanically connected with one another essentially on the side of the templet axis opposite the eccentric center of the gear with exterior teeth.

The invention is subsequently explained in more detail on the basis of an embodiment shown by way of example in the drawings.

DESCRIPTION OF THE PREFERRED EMBODIMENT

Figure 1:
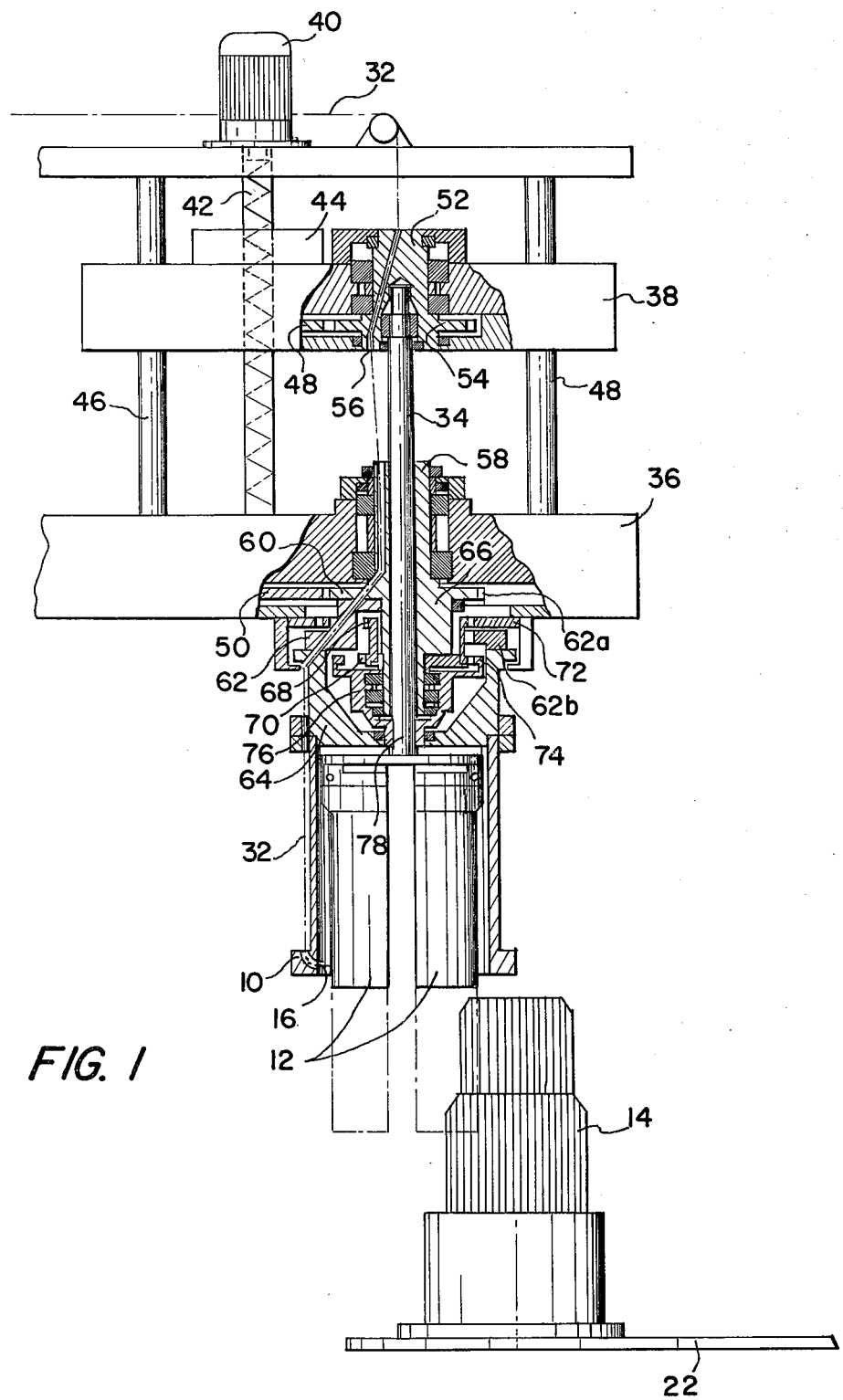
FIG. 1 shows, in a simplified presentation, a sideview, partially in section, of a winding apparatus according to the invention.

The parts essential for the function of the winding apparatus as in FIG. 1 are a wire guiding device 10, often called a flyer, which may be in the form of an essentially cylindrical bushing, or a hollow funnel or an arm, preferably with a mass compensating arm, furthermore a templet 12 (see also FIG. 2) divided in an axial direction, and finally a transfer tool 14, onto which the coils, wound by the wire guiding device 10 onto the templet 12, can be stripped and can then be drawn-in axially into a stator, preferably directly.

Wire guiding device 10, templet 12 and transfer or drawing-in tool 14 are basically known individually according to their function and construction. The temporal superposition of the winding process and the transfer are novel, for which purpose the transfer tool 14 is fixed during these processes in case of the described embodiment, the wire guiding device 10 rotates around the templet 12, but is likewise mounted axially fixed, and the templet 12 held non-rotatably moves out of the flyer 10 from above to below into position between the lamellae or fingers of the drawing-in tool 14, as shown in a broken line in FIG. 1.

Figure 2:
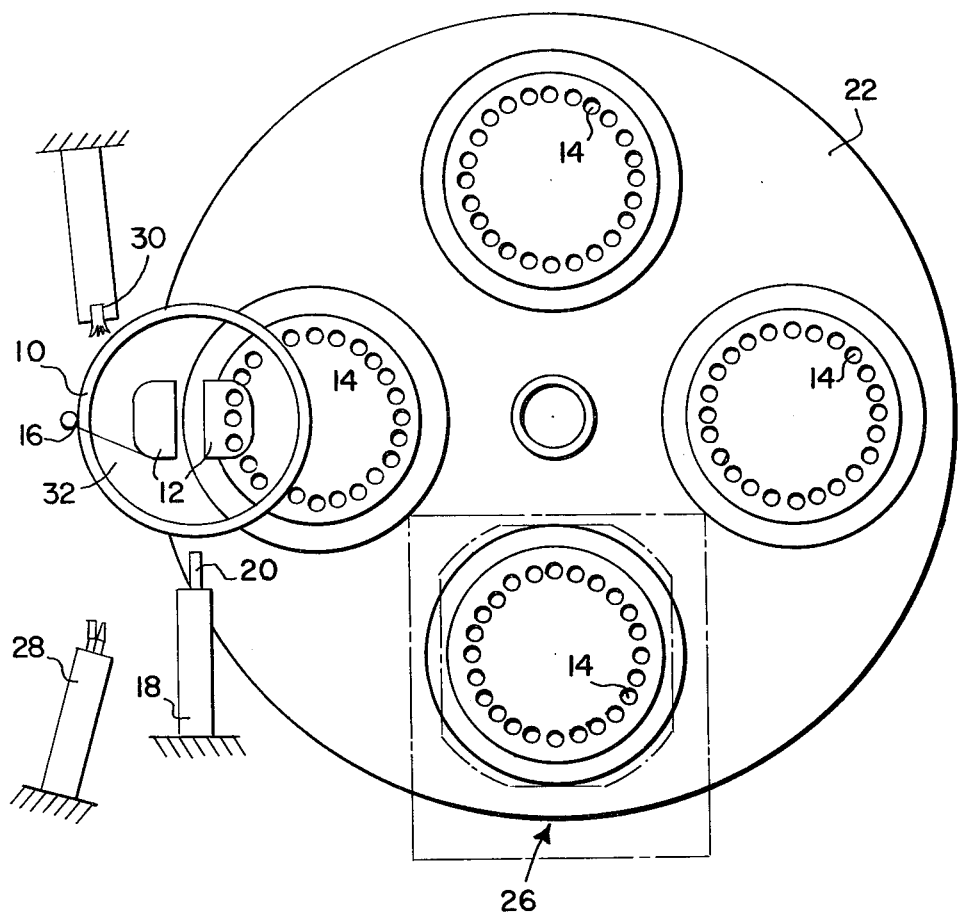
FIG. 2, shows a simplified top view of part of the apparatus according to FIG. 1.

That half of the templet 12, which thereby penetrates into the wreath of lamellae or fingers of the drawing-in tool 14, has axial holes corresponding to the position of the lamelae (see FIG. 2).

It is clear from the arrangement according to FIG. 1, that the templet 12 is wound starting from its lower end, which, since the templet at the same time is moved downward, immerses into the drawing-in tool 14 a short time afterwards while the middle and upper part of the templet are still being wound. Since the exit aperture for the wire of the wire-guiding device 10, which is designated by 16, always rotates at a certain intermediate distance above the drawing-in tool 14, it will be necessary to lower the templet by essentially this intermediate distance at the end of the winding process, and also lower the last windings at the topmost end of the templet below the upper ends of the lamellae of the drawing-in tool 14. This subsequent lowering of the templet by a relatively short stretch of the overall path requires, however, very much less time than the hitherto customary moving in of the transfer tool across the entire length of the templet.

After the templet 12 is in its lowest position in relation to FIG. 1, a retarding finger or stripper 20 is moved forward between the halves of the templet 12 by means of a piston 18 above the topmost winding. At the same time the templet 12 is opened or unbolted, i.e., the intermediate distance between the two halves of the templet is decreased so that the winding wire no longer sits fixedly on the templet. If now the templet 12 is again pulled back upwardly, then the coil remains behind at the spot between the lamellae of the drawing-in tool, determined by the width of the templet and the angular position of the drawing-in tool 14. After that the drawing-in tool 14 can be turned by a certain angle around its perpendicular center axis, and then an additional coil, wound again on the same templet 12, can be delivered in the described manner. This process is repeated until all coils of one layer are suspended between the lamellae of the drawing-in tool. After that the latter can be shifted underneath a templet formed differently in its cross section, where the coils of a further layer are wound and can be suspended from the predetermined places around a perpendicular center axis, each time after rotation of the drawing-in tool, which already carries the coils of the first layer. In the case of the embodiment as in FIG. 2, four drawing-in tools 14 are disposed on a rotary table 22, which can be rotated around a central axis, and each of which can be rotated around its center axis, and by further switching of the rotary table can be moved in succession below three different templets 12 (in FIG. 2, for reasons of simplification of the drawing, a templet with auxiliary arrangement is indicated only in case of one of the three winding stations). In the fourth switching station of the rotary table 22, which in FIG. 2 is designated by 26, a packet of stator plates is placed on the drawing-in tool 14 which has reached that point, and then the three layers of coils, of which each layer has again several individual coils, are then drawn together into the stator grooves. The drawing-in tool 14 and the drawing-in station 26 can be developed essentially as described in German Pat. Application P 2,208,865.9 (U.S. application Ser. No. 246,422, filed Apr. 21, 1972 now U.S. Pat. No. 3,762,017).

The follow-up control of the apparatus of FIG. 2 operates as follows:

If one observes only one of the three winding stations — the processes are the same in all stations — then, at the beginning of the winding process of the first coil of the layer, the end of the wire is still held clamped between a hydraulically or pneumatically advanceable cutting or clamping arrangement 28. As a result of the rotation of the wire-guiding device 10, 16 the wire is thus drawn from the supply or stock and wound on the templet 12, the halves of which are in their spread position. Since the templet 12 is lowered during the winding process, the cutting and clamping arrangement 28 must release the foremost end of the wire shortly after the start of the winding process. Since the wire will hold by itself on the templet 12 because of friction, wire is further drawn from the supply during further rotation of the wire guiding device 10, 16.

Already during winding and simultaneous lowering of the templet, a clamping device 30 is moved up hydraulically or pneumatically as closely as possible to the templet.

After winding, the templet 12 still makes only a short movement in a vertical direction. Then, the clamping device 30 moves entirely inside, seizes the hind end of the wire 32 (the connection to the wire supply) and again is pulled back to the outside, where the wire 32 is clamped down. Then the stripper 20 and the operating bolt for the unbolting of the templet also move back radially outward. While the rotary table 22 is standing still, the drawing-in tool 14 is switched further by a certain angle.

Now the winding of a new coil of the same layer can start. As a result of the fact that the clamping device 30 is still effective in the beginning, the rotating wire guiding device 10, 16 does not pull back wire from the previous coil, suspended loosely between the lamellae of the drawing-in tool 14, but it will pull the wire from the supply. After a few rotations of the wire guiding device 10, 16 the clamping device 30 releases the wire, since the lower end of the templet 12 moves away from the clamping device 30 during lowering, and the wound up windings offer enough friction so that the wire is pulled off the supply as a result of the rotation of the wire guiding organ 10, 16.

The previously described process is repeated until the last coil of a layer is wound. During the winding of that last coil onto the templet 12, this time, not the clamping device 30, but the cutting and clamping device 28 moves into the waiting (stand by) position as close as possible to the templet 12. After the conclusion of the short vertical end movement of the templet, the device 28 seizes the wire 32 between the opening 16 of the wire exit and the templet 12, moves back again, cuts the wire and keeps the end leading to the supply clamped.

Now the rotary table 22 steps by 90°, as a result of which the next following drawing-in tool reaches the winding station, and that drawing-in tool which carries the full set of coils, moves into the drawing-in position 26.

While the invention has been described in the preceding pages on the basis of an embodiment in which a templet with accompanying wire guiding device cooperates with several transfer tools disposed on a rotary table, it is understood a simpler arrangement too can operate in the sense of the invention with only one transfer tool. Only two or more than three winding stations could also be provided.

I will now describe the feed drive of the templet 12 and the rotary drive of the wire guiding device 10, 16 with reference to FIG. 1:

The templet 12 is seated firmly on a shaft 34 which is mounted axially shiftably in a fixed machine part 36 and axially firmly in an axially moveable machine part 38. The machine part 38 is moved axially in an axial direction by a feed driving motor 40 by way of a threaded spindle 42 and a nut 44 fitting said spindle and attached to the machine part 38. Guide bars 46 and 48 attached to the fixed machine part 36 give guidance to the axially movable machine part 38.

Whenever the machine part 38 is moved up or down by means of the motor 40, it will drive the templet 12 by way of the axle 34.

The motor of the rotary drive for rotation of the flyer 10, has not been shown in order to simplify the drawing. It acts by way of a driving shaft on a gear 48 mounted in the movable machine part 38 and simultaneously on a gear 50 mounted in the fixed machine part 36. The gear 48 engages with a hollow shaft 52, mounted in the movable machine part 38, onto which a gear 54 has been keyed, or which is developed on one piece with such a gear 54. As FIG. 1 shows, the axle 34 is seated coaxially in the hollow shaft 52. Since the latter is driven rotatingly, and the axle 34 is fixed non-rotatably, suitable bearings are provided between both parts. The winding wire 32 coming from the wire supply is also introduced coaxially at the rear end into the hollow shaft 52, is reoriented in it radially outward and leaves the hollow shaft 52 eccentrically on its underside at 56.

In the fixed machine part 36, a hollow shaft 58 has been mounted, in the central bore of which the axle 34 is mounted glidingly. A gear 60 is keyed onto the hollow shaft 58, which can also be made of one piece with the shaft 58. The two hollow shafts 52 and 58 are driven by the two gears 48 and 50 at precisely the same r.p.m. and while maintaining their relative position of the angle of rotation.

An intermediate ring 62 is connected in coaxial arrangement with the hollow shaft 58 and a flyer support 64 is connected with said ring, which carries the flyer 10. The winding wire 32 runs through channels in the hollow shaft 58, the intermediate ring 62, the flyer support 64 and the flyer 10, until it emerges at the lower end of the latter through the opening 16.

In order to anchor the templet 12 and the templet axle 34 non-rotatably despite the wire 32 encircling it, and despite the flyer driving mechanism, a gear with two sets of outside teeth 68 and 70 is seated on the hollow shaft 58, developed eccentrically in a central range 66. In consequence of the mounting of the gear 68, 70 which is eccentric in relation to the axle 34 and the rotational axis of the hollow shaft 58, the teeth 68 remain in continuous engagement with gear ring 72 attached non-rotatably on the fixed machine frame 36. In order that the latter may come into contact through the intermediate ring 62 with the gear 68 disposed in its interior, the intermediate ring 62 has been milled out eccentrically on the side of the greatest eccentricity of the hollow shaft 58, 66 in such a way that in the right side of FIG. 1 only the cross sectional parts designated with 62a and 62b are visible. Since the cut out sector of the intermediate ring 62 together with eccentricity 66 and the gear 68, 70 seated on it, rotate, the place at which the teeth 68 are accessible from the outside and engage with the gear ring 72, does indeed rotate.

The exterior teeth 70 engage with interior teeth 74 of a gear 76 mounted rotatably on the hollow shaft 58, which gear is keyed non-rotatably to the axle 34 below the lower end of the hollow shaft 58 at 78. Thus, the gear 76, 74 cannot rotate and holds the axle 34 and the templet 12 by way of wedging at 78. The wedge engagement is accomplished with all axial wedge grooves of the axle 34 so that the latter is still axially shiftable despite the wedging.

I claim:

1. In apparatus for the winding of wire coils which can be drawn axially into a stator of an electric machine, having a templet onto which the coil wire can be wound and from which the wound coils can be stripped, a rotatable wire-guiding device for winding wire in coil form onto said templet, and a transfer tool relatively movable axially into said templet and onto which the wound coils can be stripped from the templet, the improvement comprising means for effecting relative movement of said wire guiding device continuously in a direction axially away from said transfer tool relative to said templet and relative movement of said transfer tool continuously axially toward and into said template during winding movement of said wire guiding device, and hence during the whole winding process of a coil, said templet having an axially extending untapered surface portion onto which the wire coming from said wire-guiding device is placed such that all the turns of a coil are accumulated on the templet before removal from it.

2. Apparatus as claimed in claim 1 wherein said transfer tool is axially fixed during the winding process.

3. Apparatus as claimed in claim 1 wherein said wire guiding device is axially fixed during the winding process.

4. Apparatus as claimed in claim 1 wherein said transfer tool and said wire guiding device are relatively fixed at a predetermined axial distance from each other during at least a substantial portion of the winding process, and together continuously move axially relative to said templet during said portion of the winding process.

5. Apparatus as claimed in claim 4 wherein said wire guiding device and said transfer tool are axially fixed, and said templet is moved axially from said wire guiding device onto said transfer tool continuously during the whole winding process of a coil.

6. Apparatus as claimed in claim 1 wherein said transfer tool is a drawing-in tool for drawing wire coils directly into a stator.

7. Apparatus as claimed in claim 1 further comprising a rotatable hollow drive shaft for said wire guiding device, a templet shaft passing coaxially through said hollow shaft and carrying said templet at one end, an exteriorly toothed gear mounted rotatably and eccentrically on said hollow shaft, a first interiorly toothed gear mounted non-rotatably on the apparatus and concentric with said hollow shaft and meshing with said exteriorly toothed gear, a second interiorly toothed gear mounted concentrically and non-rotatably on said templet shaft and meshing with said exteriorly toothed gear, and means connecting said hollow shaft and said wire guiding device with one another on the side of the templet shaft opposite the center of said exteriorly toothed gear.

8. Apparatus as claimed in claim 7 wherein the templet shaft end remote from the templet is journalled in and axially fixed to an axially shiftable and rotatably driveable machine part, and the winding wire is introduced into said machine part coaxially with but behind the end of said templet shaft, then radially outwardly and axially toward said hollow shaft, and then through said hollow shaft and through said wire guiding device, and wherein means are provided for rotatably driving said machine part and said hollow shaft in unison at the same speed.

9. Apparatus as claimed in claim 6 wherein said drawing-in tool is rotatable about its axis, and wherein a plurality of said drawing-in tools are mounted on a rotatable table for movement selectively to a plurality of said templets and to a drawing-in station.

10. Apparatus as claimed in claim 1 further comprising a stripper moveable across the complete wire coil accumulated on the template when the templet has moved relatively into the transfer tool for retaining the wire coil on the transfer tool upon relative withdrawal of the templet from the transfer tool.

11. Apparatus as claimed in claim 9 further comprising a wire clamping device disposed adjacent each template in a position to hold the wire during rotation of the drawing-in tool after stripping of a completed coil and during the beginning of the wind process for a further coil for the same drawing-in tool.

12. Apparatus as claimed in claim 9 further comprising a combined cutting and clamping device disposed adjacent each templet for cutting the wire after winding of the last coil to be suspended on a given drawing-in tool at a given position of the rotary table, and for clamping the supply end of the wire until the beginning of the winding process for the first coil of the coils to be transferred to a further drawing-in tool.

13. Apparatus as claimed in claim 1 wherein said wire guiding device is stopped in the same angle of rotation after each winding process to facilitate access of an operating member to an unlocking mechanism of said templet.

* * * * *